(12) United States Patent
Wada

(10) Patent No.: US 7,891,264 B2
(45) Date of Patent: Feb. 22, 2011

(54) DRIVING MECHANISM FOR CARRIER, RECORDING APPARATUS, AND READING APPARATUS

(75) Inventor: Toshihide Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 12/182,984

(22) Filed: Jul. 30, 2008

(65) Prior Publication Data
US 2009/0031833 A1    Feb. 5, 2009

(30) Foreign Application Priority Data
Aug. 3, 2007   (JP) .............................. 2007-202725

(51) Int. Cl.
 *F16H 1/04* (2006.01)
 *F16H 55/18* (2006.01)
 *F16H 57/00* (2006.01)
 *B41J 23/00* (2006.01)

(52) U.S. Cl. .............................. 74/422; 74/409; 74/411; 347/37

(58) Field of Classification Search .................. 74/422, 74/409, 411, 22 A, 22 R, 25, 89.17; 347/37
See application file for complete search history.

(56) References Cited

U.S. PATENT DOCUMENTS

| | | | | | |
|---|---|---|---|---|---|
| 3,038,845 | A | * | 6/1962 | Johnson et al. | 376/232 |
| 4,066,356 | A | * | 1/1978 | Parker | 355/63 |
| 4,550,626 | A | * | 11/1985 | Brouwer | 74/409 |
| 5,390,557 | A | * | 2/1995 | Tsukada | 74/89.17 |
| 5,582,070 | A | * | 12/1996 | Dominguez | 74/411 |
| 6,022,091 | A | | 2/2000 | Uchikata et al. | |
| 6,920,803 | B2 | * | 7/2005 | Hasegawa | 74/89.22 |

* cited by examiner

*Primary Examiner*—Thomas R Hannon
*Assistant Examiner*—Justin Krause
(74) *Attorney, Agent, or Firm*—Canon USA Inc IP Div

(57) ABSTRACT

A driving mechanism for a carrier can prevent drive transmission units used for reciprocation of the carrier from becoming damaged, dented, or deformed even when an apparatus receives vibration or impact from the outside. The driving mechanism includes first and second pinion components held by a carrier, first and second rack segments fixed to a main apparatus body, and a connector rack segment fixed between the first and second rack segments. When the carrier performs recording, the first pinion component engages with the first rack segment. When the carrier is at a home position, the second pinion component engages with the second rack segment.

11 Claims, 8 Drawing Sheets

DRIVING MECHANISM FOR CARRIER, RECORDING APPARATUS, AND READING APPARATUS

BACKGROUND OF THE INVENTION

1. Field of the Invention

The present invention relates to a driving mechanism for a carrier that is movable in a reciprocating fashion relative to a main apparatus body, to a recording apparatus equipped with such a driving mechanism, and to a reading apparatus equipped with such a driving mechanism.

2. Description of the Related Art

In recording apparatuses that record images onto recording media such as paper based on image information using recording heads, or in reading apparatuses such as scanners that read originals, an image recording operation on a recording medium or a reading operation of an original can be performed by moving a carrier that carries a recording head or an image reading sensor in a reciprocating fashion within the main apparatus body. A driving mechanism of a known type used for moving the carrier includes a motor fixed to the main apparatus body, and transmission units such as a timing belt for transferring the driving force of the motor to the carrier. A driving mechanism of this type is equipped with a guide unit defined by a guide shaft fixed to the main apparatus body. The carrier is allowed to move in a reciprocating fashion along this guide shaft.

A guide unit such as this guide shaft has a rigid body having non-flexible and twist-resistant properties. If the guide unit and the transmission units are to be integrated, the transmission units will also have a rigid body. Giving the transmission units a rigid body can be problematic in that the transmission units on the main apparatus body side and the carrier side can possibly collide against each other with great force when the main apparatus body receives vibration or impact from the outside. This can possibly cause the transmission units to become damaged, dented, or deformed. To solve this problem, U.S. Pat. No. 6,022,091 discloses a driving mechanism for a carrier that employs a lead screw. In this driving mechanism, a protrusion provided on the carrier is brought into engagement with a helical guide groove of the lead screw, so that by rotationally driving the lead screw, the carrier can be moved in the axial direction of the lead screw. With this driving mechanism equipped with a lead screw, the carrier can be reciprocated with high accuracy.

When an apparatus equipped with this lead-screw-type driving mechanism is in a stopped state, such as when the apparatus is stored or is being transported, the protrusion on the carrier is positioned in engagement with a designated guide groove provided exclusively for the stop position. It is especially during this stopped state of the apparatus, such as when the apparatus is stored or is being transported, that the main apparatus body receives vibration or impact from the outside. Since none of the sections of the carrier during the stopped state of the apparatus are in contact with the helical guide groove located in the range where high accuracy movement of the carrier is required, damage, dents, or deformations rarely occur in this range even if the main apparatus body receives vibration or impact from the outside.

However, with the lead-screw-type driving mechanism described above, since the protrusion on the carrier is positioned in engagement with the designated guide groove for the stopped state, there is a possibility that a vibration or impact applied to the main apparatus body during transportation of the apparatus may cause the main apparatus body and the carrier to hit against each other through the protrusion. This can possibly cause the drive transmission units to become damaged, dented, or deformed.

SUMMARY OF THE INVENTION

The present invention provides a driving mechanism for a carrier that can prevent drive transmission units used for reciprocation of the carrier from becoming damaged, dented, or deformed even when an apparatus receives vibration or impact from the outside. The present invention also provides a recording apparatus equipped with such a driving mechanism for a carrier, and a reading apparatus equipped with such a driving mechanism for a carrier.

According to an aspect of the present invention, a driving mechanism for a carrier that is movable relative to a main apparatus body is provided. The driving mechanism includes a driving portion disposed in the carrier; first and second drive transmission units disposed in the carrier and being rotationally driven by the driving portion; a third drive transmission unit disposed in the main apparatus body and being engageable with the first drive transmission unit; a fourth drive transmission unit disposed in the main apparatus body and being engageable with the second drive transmission unit; and a fifth drive transmission unit disposed between the third drive transmission unit and the fourth drive transmission unit. The carrier is movable to a first region, a second region, and a third region. Specifically, the first region is where the first drive transmission unit engages with the third drive transmission unit, the second region is where the second drive transmission unit engages with the fourth drive transmission unit, and the third region is where the first drive transmission unit and the second drive transmission unit engage with the fifth drive transmission unit.

Further features of the present invention will become apparent from the following description of exemplary embodiments with reference to the attached drawings.

DESCRIPTION OF THE EMBODIMENTS

Figure 1:
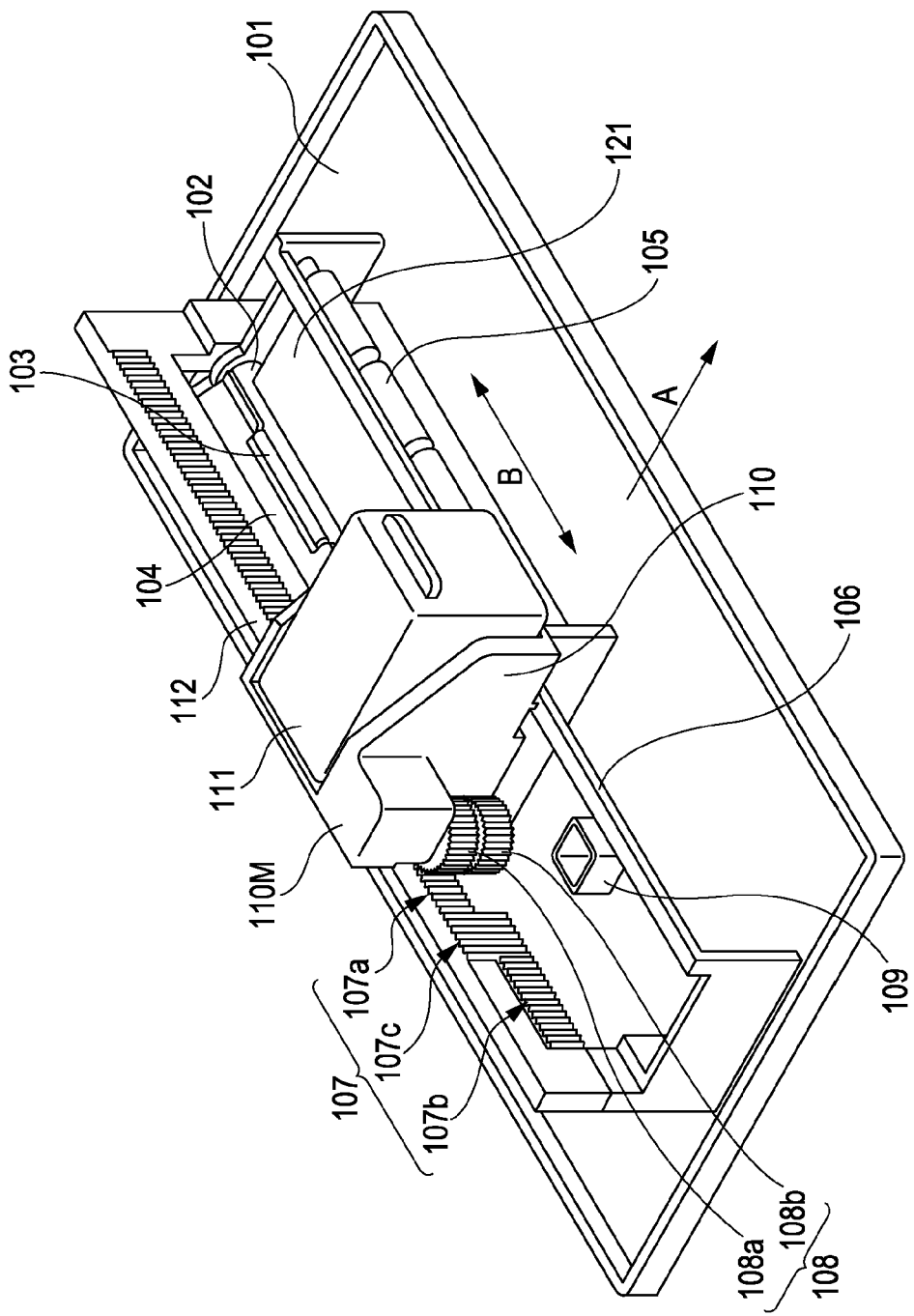
FIG. 1 is a perspective view of a recording apparatus equipped with a driving mechanism for a carrier according to an exemplary embodiment of the present invention.
Figure 2:
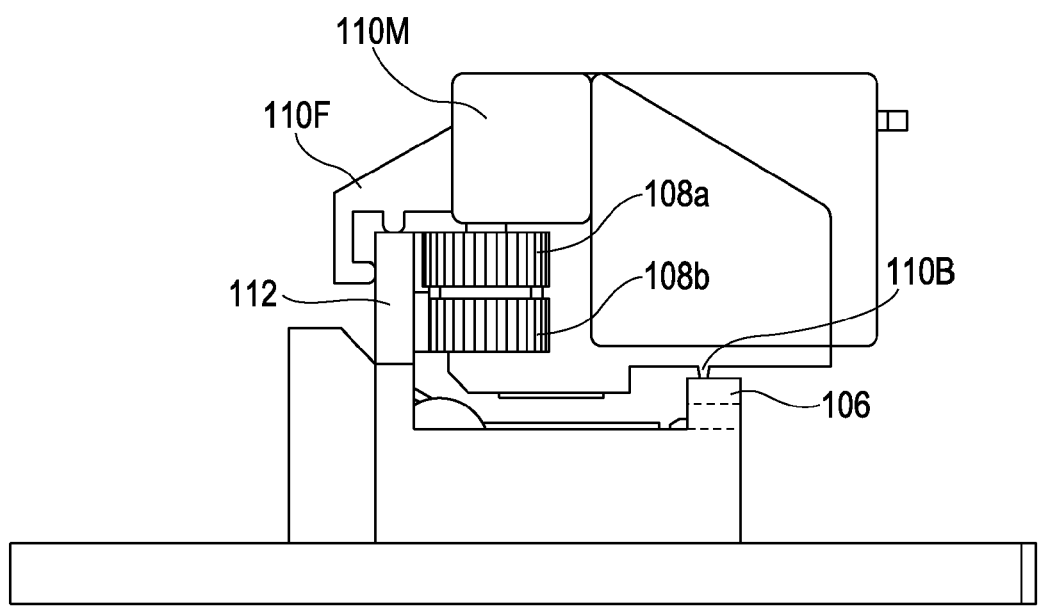
FIG. 2 is a longitudinal sectional view of the driving mechanism for the carrier shown in FIG. 1.

Exemplary embodiments of the present invention will be described in detail below with reference to the drawings. Throughout the drawings, like reference characters designate the same or similar parts. FIG. 1 is a perspective view of a recording apparatus equipped with a driving mechanism for a carrier according to an exemplary embodiment of the present invention. FIG. 2 is a longitudinal sectional view of the driving mechanism for the carrier shown in FIG. 1. The present embodiment is directed to the case where the apparatus equipped with the carrier is a recording apparatus. Referring to FIGS. 1 and 2, the recording apparatus includes a main apparatus body 101, a conveying roller 102 configured to convey a sheet material 406 serving as a recording medium, and a pinch roller 103 configured to press the sheet material 406 into contact with the conveying roller 102. The pinch roller 103 is supported by a holder 104. Reference numeral 105 denotes an ejection roller configured to be driven in synchronization with the conveying roller 102 so as to convey the sheet material 406 in a direction indicated by an arrow A.

The conveying roller 102 and the ejection roller 105 have a platen 121 disposed therebetween, which is configured to support the sheet material 406. A carrier 110 that carries a recording head 111 is positioned facing the platen 121 and is supported in a reciprocable manner in a direction indicated by an arrow B. The main apparatus body 101 is provided with guide members 112 and 106, and the carrier 110 is provided with guide portions 110F and 110B. The carrier 110 is supported in a movable manner such that the guide portions 110F and 110B thereof can be slidably guided along the guide members 112 and 106, respectively. These guide portions 110F and 110B and guide members 112 and 106 constitute a guide unit for the carrier 110.

The following is a description of the driving mechanism for the carrier 110 that is movable in a reciprocating fashion relative to the main apparatus body 101. The carrier 110 is equipped with a driving portion 110M. The driving portion 110M includes a motor, and the carrier 110 has a pinion 108 that can be driven by the motor. In this embodiment, the pinion 108 is fixed to an output shaft of the motor (i.e. the driving portion 110M). The pinion 108 that can be driven by the driving portion 110M includes two coaxial pinion components 108a and 108b. A first pinion component 108a serves as a first drive transmission portion contained in the carrier 110 and can be rotationally driven by the driving portion 110M. A second pinion component 108b serves as a second drive transmission portion contained in the carrier 110 and can be rotationally driven by the driving portion 110M.

The guide member 112 provided in the main apparatus body 101 has a rack 107 on a surface thereof, which is engageable with the pinion 108. The rack 107 includes a first rack segment 107a engageable only with the first pinion component 108a, a second rack segment 107b engageable only with the second pinion component 108b, and a third rack segment 107c engageable with both the first pinion component 108a and the second pinion component 108b. In accordance with the positional relationship between the first pinion component 108a and the second pinion component 108b, the first rack segment 107a and the second rack segment 107b are intentionally not aligned with each other in the direction of the arrow B and in the vertical direction. The first rack segment 107a is provided in an area that includes a region in which the carrier 110 moves for a recording operation. On the other hand, the second rack segment 107b is located in an area not involved with the recording operation, which includes a standby position of the carrier 110. The third rack segment 107c is located between the first rack segment 107a and the second rack segment 107b and connects the first rack segment 107a and the second rack segment 107b.

With the guide portion 110F of the carrier 110 being guidable along the guide member 112, the rack 107 and the pinion 108 can be meshed with a fixed distance constantly maintained on a pitch circle. When the pinion 108 is rotationally driven by the driving portion 110M, the carrier 110 carrying the recording head 111 is reciprocated in the direction of the arrow B along the rack 107. Accordingly, the driving mechanism for the carrier 110 includes a third drive transmission unit defined by the first rack segment 107a fixed to the main apparatus body 101, a fourth drive transmission unit defined by the second rack segment 107b fixed to the main apparatus body 101, and a fifth drive transmission unit defined by the third rack segment 107c fixed between the first rack segment 107a and the second rack segment 107b.

The movement range of the carrier 110 includes a first movement region, a second movement region, and a third movement region. The first movement region is where the first pinion component 108a engages with the first rack segment 107a in a drive-transmissible manner and is a region in which the carrier 110 is reciprocated during a recording operation. The second movement region is where the second pinion component 108b engages with the second rack segment 107b in a drive-transmissible manner. The second movement region includes positions where the carrier 110 is stopped when the recording operation is not performed, such as a standby position of the carrier 110. Specifically, the carrier 110 can be stopped at these positions when the apparatus is to be stored or transported. The third movement region is located between the first movement region and the second movement region, and serves as a common region for connecting these two movement regions. In the third movement region, the first pinion component 108a and the second pinion component 108b are both engageable with the third rack segment 107c in a drive-transmissible manner. The third rack segment 107c includes an upper rack section connected to the first rack segment 107a and a lower rack section connected to the second rack segment 107b. In the first movement region, the second pinion component 108b is non-engageable with the first rack segment 107a, whereas in the second movement region, the first pinion component 108a is non-engageable with the second rack segment 107b.

The recording apparatus according to this embodiment is an inkjet recording apparatus that performs recording by discharging ink droplets selectively from a plurality of nozzles arranged on a nozzle surface of the recording head 111 on the basis of image information. Near a home position of the carrier 110 is disposed a cap 109 that can be hermetically attached to the nozzle surface of the recording head 111 by a driving mechanism (not shown) when the carrier 110 is returned to the home position. The cap 109 not only protects the nozzle surface, but also reduces vaporization of ink from the nozzles.

Figure 3:
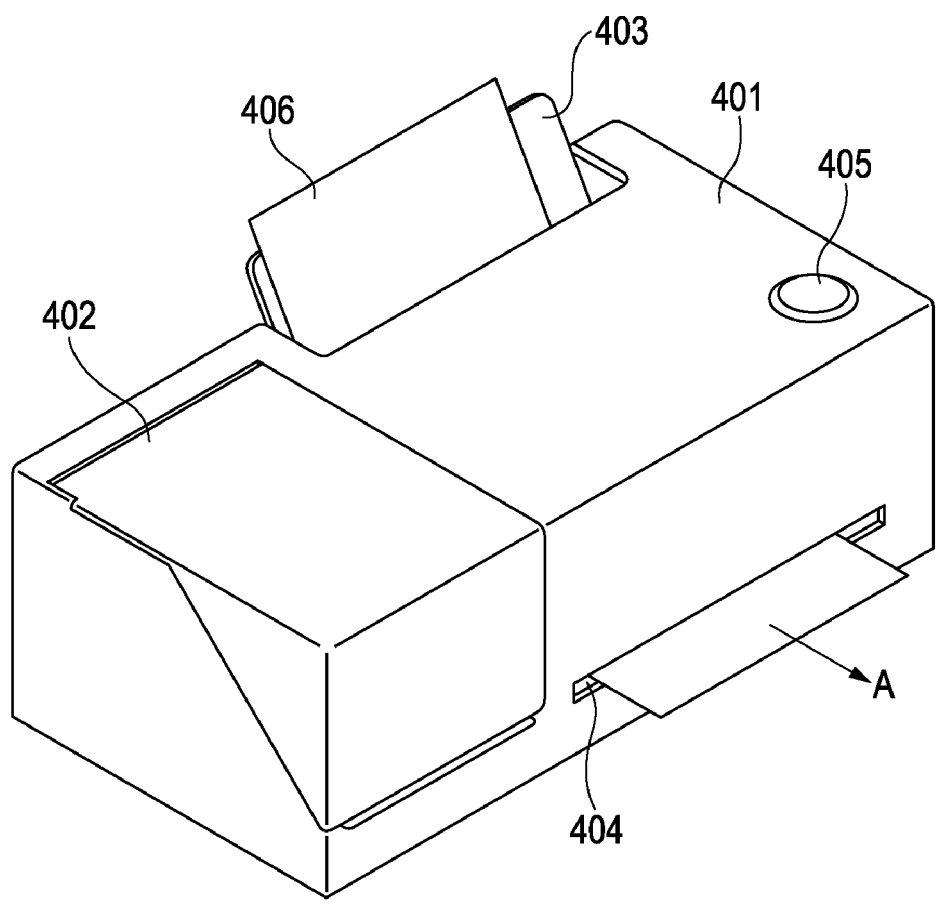
FIG. 3 is an external perspective view showing a state where a recording operation is being performed using the recording apparatus shown in FIG. 1.
Figure 4:
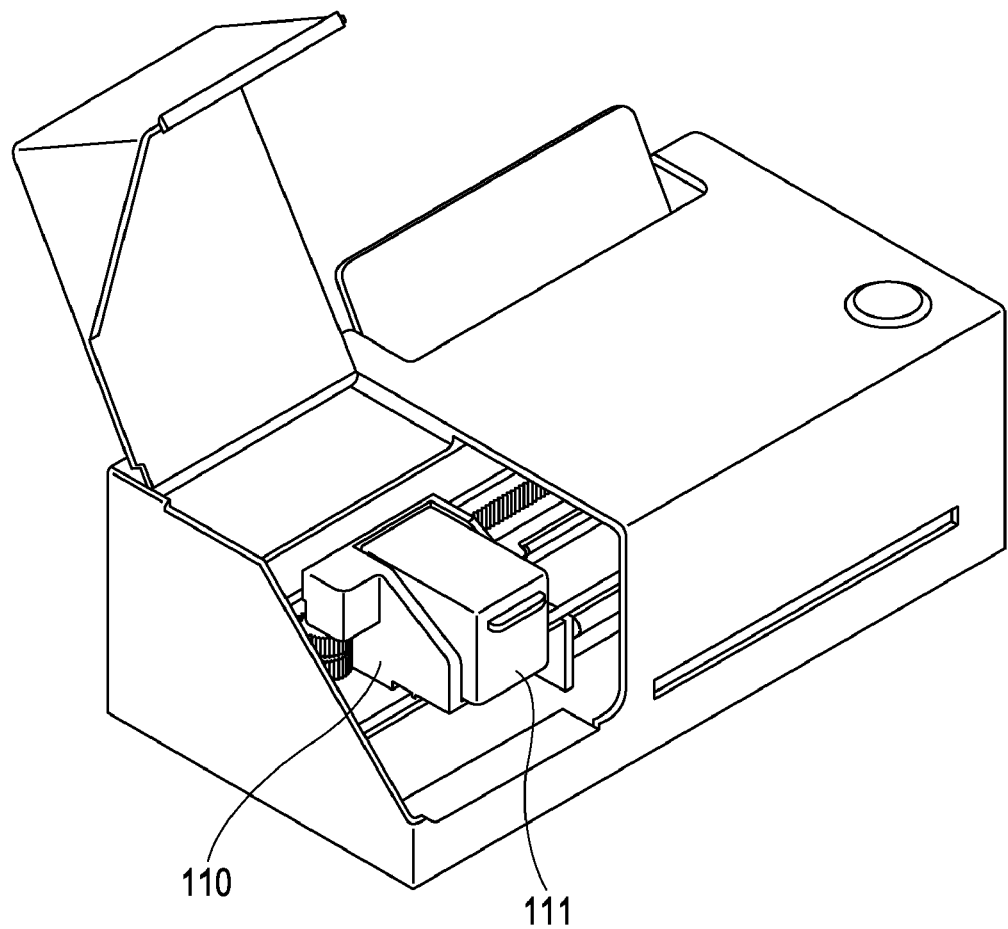
FIG. 4 is an external perspective view showing a state where a recording head is being replaced with another in the recording apparatus shown in FIG. 1.

FIG. 3 is an external perspective view showing a state where a recording operation is being performed using the recording apparatus shown in FIG. 1. FIG. 4 is an external perspective view showing a state where the recording head 111 is being replaced with another in the recording apparatus shown in FIG. 1. Referring to FIGS. 3 and 4, the recording apparatus includes an external cover 401 that covers the main apparatus body 101, an openable cover 402 configured to be opened for when replacing the recording head 111 on the carrier 110 with another one, a feed guide 403 used for setting the sheet material (recording medium) 406 to a feed position, an ejection outlet 404 through which the sheet material 406 having undergone a recording operation can be ejected, and a power switch 405. The arrow A indicates the conveying direction of the sheet material 406.

Figure 5:
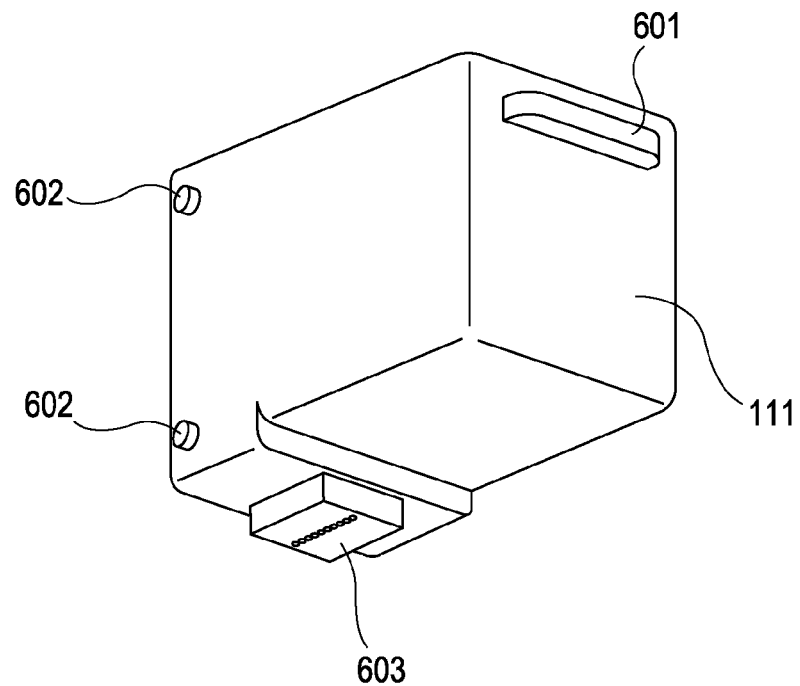
FIG. 5 is a perspective view of the recording head, as viewed from the bottom side thereof.
Figure 6:
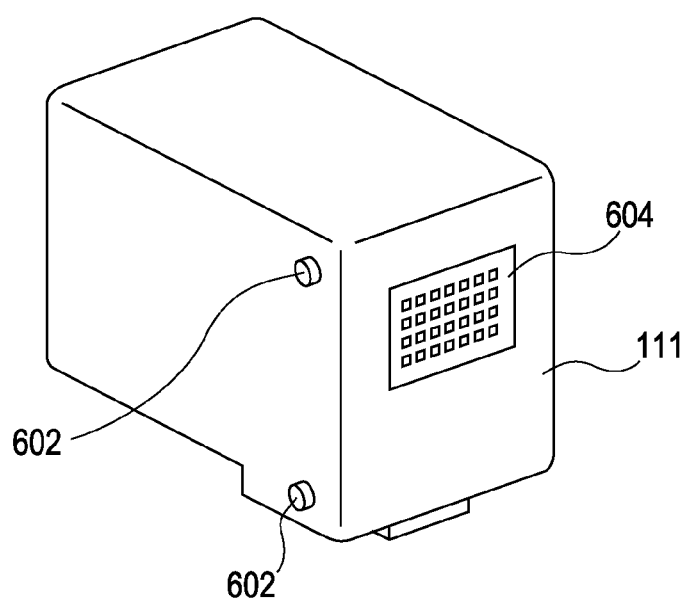
FIG. 6 is a perspective view of the recording head, as viewed from the back thereof.

FIG. 5 is a perspective view of the recording head 111, as viewed from the bottom side thereof. FIG. 6 is a perspective view of the recording head 111, as viewed from the back thereof. Referring to FIGS. 5 and 6, the recording head 111 includes a handhold 601 to be used for during attachment and detachment of the recording head 111, projections 602 engageable with engagement portions of the carrier 110 so that the recording head 111 can be fixed to the carrier 110, an ink discharge portion 603 including a nozzle surface having thereon a nozzle array consisting of a plurality of nozzles arranged at a predetermined pitch, and a terminal substrate 604 that transmits an electric signal to the recording head 111 by being brought into contact with a terminal substrate of the carrier 110. The terminal substrate of the carrier 110 can receive an electric signal from a control substrate in the main apparatus body 101 via a flexible cable.

Figure 7:
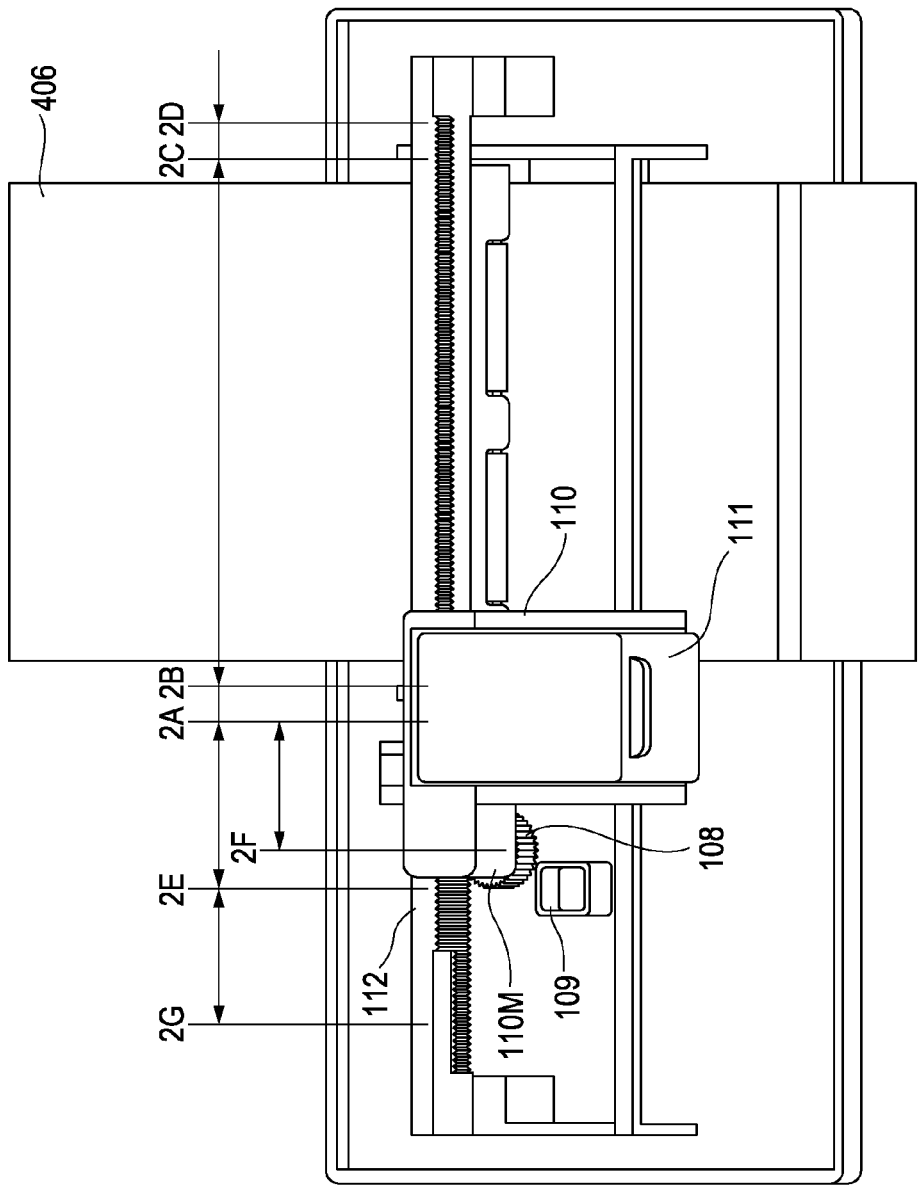
FIG. 7 is a plan view illustrating relationships among various positions in a movement range of the carrier included in the recording apparatus in FIG. 1.

FIG. 7 is a plan view illustrating relationships among various positions in the movement range of the carrier 110 included in the recording apparatus in FIG. 1. Specifically, FIG. 7 shows various positions and movement zones of the carrier 110 based on positions that can be taken by the ink discharge portion 603 (specifically, the nozzle array having the plurality of nozzles) of the recording head 111 held by the carrier 110. In FIG. 7, a zone defined between positions 2B and 2C ("zone 2B-2C") is a recording zone where actual recording can be performed on the sheet material 406, and a zone defined between positions 2A and 2B ("zone 2A-2B") and a zone defined between positions 2C and 2D ("zone 2C-2D") are acceleration zones for the carrier 110 which are located at opposite sides of the recording zone 2B-2C. A position 2E is a home position for the carrier 110. When the carrier 110 is stopped at this home position 2E, the cap 109 is raised so as to be in contact with the nozzle surface. Thus, the cap 109 can hermetically seal the nozzle array as well as protecting the ink discharge portion 603.

When the ink discharge portion 603 is at the position 2A, the pinion 108 is at a position 2F. In this state, the first pinion component 108a is meshed with the first rack segment 107a, whereas the second pinion component 108b is not meshed with any of the rack segments. When the ink discharge portion 603 moves from the position 2A towards the position 2B, the meshed state between the first pinion component 108a and the first rack segment 107a is maintained. Consequently, when the ink discharge portion 603 is located to the right of the position 2A in FIG. 7, the first pinion component 108a and the first rack segment 107a are the only meshed pair.

As the ink discharge portion 603 moves from the position 2A toward the position 2E, the meshed pair of first pinion component 108a and first rack segment 107a shifts to the range of the third rack segment 107c. Upon reaching this range of the third rack segment 107c, the second pinion component 108b becomes meshed with the extension of the second rack segment 107b. In other words, the third rack segment 107c unites the extension of the first rack segment 107a and the extension of the second rack segment 107b, such that the first pinion component 108a and the second pinion component 108b can both be simultaneously meshed with the rack 107 in the range of the third rack segment 107c. The left side of the third rack segment 107c is provided with only the second rack segment 107b. Consequently, as the carrier 110 moves further to the left until the first pinion component 108a and the second pinion component 108b are past the third rack segment 107c, the second pinion component 108b and the second rack segment 107b become the only meshed pair. In this state, the first pinion component 108a is in an isolated state. As the ink discharge portion 603 reaches the home position 2E, the second pinion component 108b meshes with the second rack segment 107b at a position 2G while the first pinion component 108a remains in an isolated state.

Accordingly, when the ink discharge portion 603 is positioned within the range between the positions 2A and 2D, which is the movement range for recording, the first pinion component 108a is meshed with the first rack segment 107a. On the other hand, when the ink discharge portion 603 is stopped at the home position 2E, the second pinion component 108b and the second rack segment 107b are the only meshed pair, and the first pinion component 108a can be kept in an isolated state. In the range where the first pinion component 108a and the first rack segment 107a mesh with each other, the carrier 110 needs to be moved with high accuracy for the recording operation. To achieve this, the first pinion component 108a and the first rack segment 107a need to be formed with high accuracy.

According to this embodiment, when the apparatus is stored or being transported, the first pinion component 108a and the first rack segment 107a are configured to be unmeshed with each other. Therefore, in the case where the main apparatus body 101 receives vibration or impact from the outside, the first pinion component 108a and the first rack segment 107a are substantially unaffected by the vibration or the impact. Accordingly, the present embodiment can provide a driving mechanism free of damages, dents, or deformations that can produce an adverse effect on the highly accurate movement of the carrier 110.

Although the second pinion component 108b and the second rack segment 107b are meshed with each other when the carrier 110 is at the home position 2E, a vibration or impact supposedly imparted to these drive transmission portions would substantially have no effect on the movement of the carrier 110 during recording. Specifically, supposing that the second pinion component 108b and the second rack segment 107b become damaged, dented, or deformed, the damages, dents, or deformations would substantially have no effect on the movement of the carrier 110 for recording as long as the carrier 110 can be moved to the third rack segment 107c which is where the first pinion component 108a and the first rack segment 107a become meshed with each other.

Figure 8:
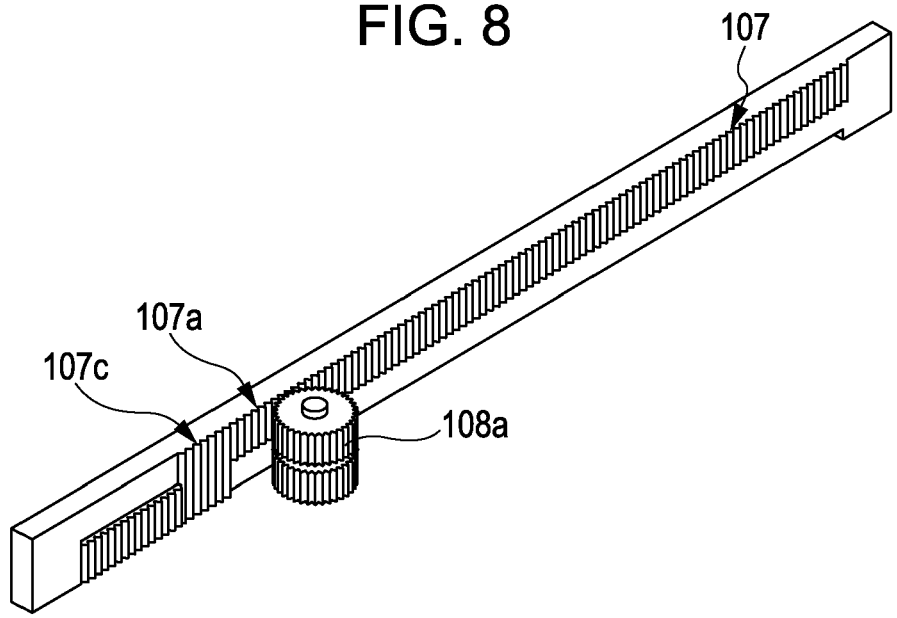
FIG. 8 is a perspective view showing a state where a first pinion component and a first rack segment are meshed with each other.
Figure 9:
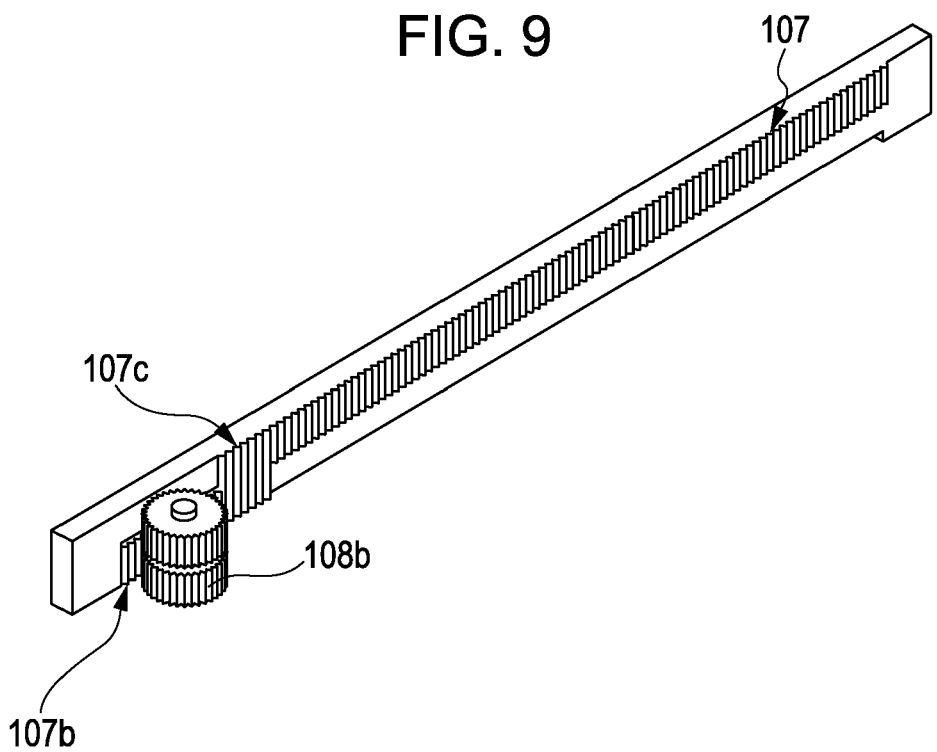
FIG. 9 is a perspective view showing a state where a second pinion component and a second rack segment are meshed with each other.

FIG. 8 is a perspective view showing a state where the first pinion component 108a and the first rack segment 107a are meshed with each other. FIG. 9 is a perspective view showing a state where the second pinion component 108b and the second rack segment 107b are meshed with each other. Referring to FIGS. 8 and 9, if involute gear teeth are to be used for the pinion 108 and the rack 107 in the present embodiment, then the pinion components 108a and 108b are made of gear teeth with the same module, and likewise, the rack segments 107a and 107b are made of gear teeth with the same module. By giving the first and second pinion components 108a and 108b the same pitch diameter, the center distance with respect to the first and second rack segments 107a and 107b can be a fixed value. The phase of the gear teeth of the first and second pinion components 108a and 108b and the phase of the gear teeth of the first and second rack segments 107a and 107b are set to the same value.

As long as the first and second pinion components 108a and 108b have the same pitch diameter, the first and second pinion components 108a and 108b can alternatively have gear teeth with different modules. In that case, the respective first and second rack segments 107a and 107b are similarly given gear teeth with the corresponding different modules. By setting the same module with respect to a meshable pair of rack segment and pinion component in this manner, the switching of pinion-and-rack meshing in the third rack segment 107c can be performed smoothly without having to change the center distance. In other words, even in the case where the meshable pairs of rack segments and pinion components have different modules in accordance with the movement regions of the carrier 110, the same pitch diameter of the pinion components can allow for smooth switching of pinion-and-rack meshing, whereby the carrier 110 can be moved without any problems.

Figure 10:
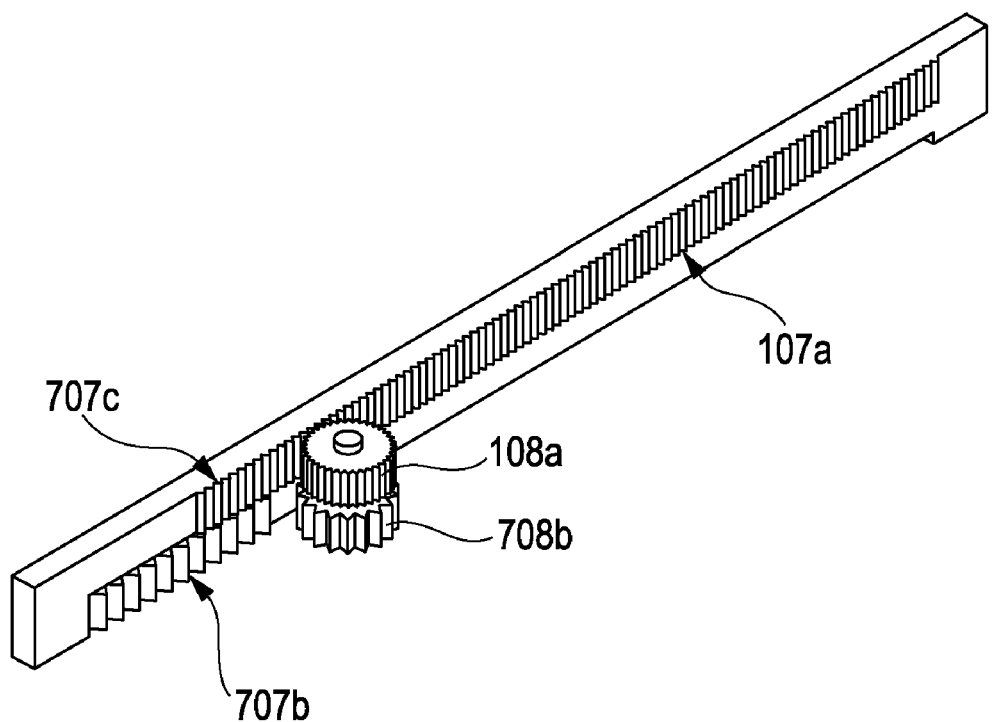
FIG. 10 is a perspective view showing another example of a pinion-and-rack configuration.

FIG. 10 is a perspective view showing an example where the meshable pairs of pinion components and rack segments have gear teeth with different modules. In a driving mechanism shown in FIG. 10, two meshable pairs of drive transmission units have involute gear teeth with different modules from each other. In FIG. 10, the first pinion component 108a shown in FIGS. 8 and 9 is still used, but the second pinion component 108b has been changed to a second pinion component 708b having gear teeth with a larger module. Likewise, the first rack segment 107a is still used, but the second rack segment 107b has been changed to a second rack segment 707b having gear teeth with a larger module. The third rack segment 107c has been changed to a third rack segment 707c having an upper rack section and a lower rack section that are given gear teeth having different modules from each other. Specifically, the upper rack section of the third rack segment 707c has the same module as that of the first pinion component 108a, and the lower rack section has the larger module which is the same as that of the second pinion component 708b. In this manner, the module corresponding to the home position 2E of the carrier 110 is made larger than the module corresponding to the region for recording, thereby increasing the strength of the drive transmission portions against vibration and impact imparted to the main apparatus body 101.

Although the drive transmission units for moving the carrier are defined by a pinion and a rack in the above-described embodiment, other alternative drive transmission units are permissible as long as the mechanism thereof is capable of moving the carrier by a rotational driving force. Examples of such mechanism include a mechanism configured to sequentially engage protrusions and recesses (or openings) with each other, which are arranged at a predetermined pitch, and a mechanism configured to engage a protrusion and a helical groove with each other while rotating the protrusion or the helical groove.

The above embodiment is directed to a driving mechanism for a carrier contained in an inkjet recording apparatus that is equipped with an inkjet recording head configured to perform recording by discharging ink based on image information. Alternatively, the present invention can be similarly applied to other types of recording apparatuses that record images onto recording media using recording heads held by reciprocable carriers. These other types of recording apparatuses may include, for example, a thermal transfer type, a thermosensitive type, a laser beam type, and a wire-dot type. Furthermore, the driving mechanism for a carrier according to the present invention can be similarly applied to a driving mechanism for a reciprocable carrier contained in a reading apparatus configured to read an image on an original using a reading sensor held by the carrier.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-202725 filed Aug. 3, 2007, which is hereby incorporated by reference herein in its entirety.

What is claimed is:

1. A driving mechanism for a carrier that is movable relative to a main apparatus body, comprising:
    a driving portion disposed in the carrier;
    first and second drive transmission units disposed in the carrier and being rotationally driven by the driving portion;
    a third drive transmission unit disposed in the main apparatus body and being engageable with the first drive transmission unit;
    a fourth drive transmission unit disposed in the main apparatus body and being engageable with the second drive transmission unit; and
    a fifth drive transmission unit disposed between the third drive transmission unit and the fourth drive transmission unit,
    wherein the carrier is movable to a first region, a second region, and a third region, the first region being where the first drive transmission unit engages with the third drive transmission unit, the second region being where the second drive transmission unit engages with the fourth drive transmission unit, the third region being where the first drive transmission unit and the second drive transmission unit engage with the fifth drive transmission unit, wherein the second drive transmission unit is separated from the third drive transmission unit when the carrier is in the first region, and wherein the first drive transmission unit is separated from the fourth drive transmission unit when the carrier is in the second region.

2. The driving mechanism according to claim 1, wherein the first drive transmission unit and the second drive transmission unit each comprise a pinion, and wherein the third drive transmission unit and the fourth drive transmission unit each comprise a rack.

3. The driving mechanism according to claim 2, wherein the first drive transmission unit and the second drive transmission unit have the same pitch diameter.

4. The driving mechanism according to claim 2, wherein the first drive transmission unit and the third drive transmission unit have involute gear teeth with a module different from that of involute gear teeth provided in the second drive transmission unit and the fourth drive transmission unit.

5. A recording apparatus comprising:
    a carrier configured to hold a recording head;
    a driving portion disposed in the carrier;
    first and second drive transmission units disposed in the carrier and being rotationally driven by the driving portion;
    a third drive transmission unit disposed in a main apparatus body and being engageable with the first drive transmission unit;
    a fourth drive transmission unit disposed in the main apparatus body and being engageable with the second drive transmission unit; and
    a fifth drive transmission unit disposed between the third drive transmission unit and the fourth drive transmission unit,
    wherein the carrier is movable to a first region, a second region, and a third region, the first region being where the first drive transmission unit engages with the third drive transmission unit, the second region being where the second drive transmission unit engages with the fourth drive transmission unit, the third region being where the first drive transmission unit and the second drive transmission unit engage with the fifth drive transmission unit, and wherein the second drive transmission unit is separated from the third drive transmission unit when the carrier is in the first region, and wherein the first drive transmission unit is separated from the fourth drive transmission unit when the carrier is in the second region.

6. The recording apparatus according to claim 5, wherein the first drive transmission unit and the second drive transmission unit each comprise a pinion, and wherein the third drive transmission unit and the fourth drive transmission unit each comprise a rack.

7. The recording apparatus according to claim 6, wherein the first drive transmission unit and the second drive transmission unit have the same pitch diameter.

8. The recording apparatus according to claim 6, wherein the first drive transmission unit and the third drive transmission unit have involute gear teeth with a module different from that of involute gear teeth provided in the second drive transmission unit and the fourth drive transmission unit.

9. The recording apparatus according to claim 5, wherein the carrier performs recording in the first region using the recording head held by the carrier.

10. The recording apparatus according to claim 9, wherein the recording apparatus is transported when the carrier is positioned in the second region.

11. A reading apparatus comprising:
a carrier configured to hold a reading sensor;
a driving portion disposed in the carrier;
first and second drive transmission units disposed in the carrier and being rotationally driven by the driving portion;
a third drive transmission unit disposed in a main apparatus body and being engageable with the first drive transmission unit;
a fourth drive transmission unit disposed in the main apparatus body and being engageable with the second drive transmission unit; and
a fifth drive transmission unit disposed between the third drive transmission unit and the fourth drive transmission unit,
wherein the carrier is movable to a first region, a second region, and a third region, the first region being where the first drive transmission unit engages with the third drive transmission unit, the second region being where the second drive transmission unit engages with the fourth drive transmission unit, the third region being where the first drive transmission unit and the second drive transmission unit engage with the fifth drive transmission unit, and
wherein the second drive transmission unit is separated from the third drive transmission unit when the carrier is in the first region, and wherein the first drive transmission unit is separated from the fourth drive transmission unit when the carrier is in the second region.

* * * * *